United States Patent [19]

Kangas

[11] Patent Number: 5,054,932
[45] Date of Patent: Oct. 8, 1991

[54] SEGMENTED BARREL EXTRUDER DEVICE

[76] Inventor: Waino J. Kangas, P.O. Box 502, Milford, Del. 19963

[21] Appl. No.: 627,974

[22] Filed: Dec. 17, 1990

[51] Int. Cl.$^5$ ............................................. B29C 47/82
[52] U.S. Cl. ...................................... 366/84; 366/149; 425/204; 425/378.1
[58] Field of Search .................. 366/144, 147, 149, 83, 366/84; 425/200, 204, 205, 378.1

[56] References Cited

U.S. PATENT DOCUMENTS

| | | | |
|---|---|---|---|
| 3,416,774 | 12/1968 | Fritsch | 366/147 |
| 4,235,581 | 11/1980 | Anders | 425/378 R |
| 4,415,268 | 11/1983 | Brinkmann et al. | 366/149 |
| 4,643,660 | 2/1987 | Capelle | 425/190 |

Primary Examiner—Jay H. Woo
Assistant Examiner—William J. Matney
Attorney, Agent, or Firm—John S. Munday

[57] ABSTRACT

A segmented extruder device for extrusion along a longitudinal axis. The device has a plurality of segments enclosing a barrel aligned on the axis. The segments each include a pair of axially perpendicular end flanges for each segment. Each of the flanges have exposed sides and a central portion for housing an extruder barrel. The flanges have a plurality of straight line paths for fluid flow into and out of the flanges in a plane perpendicular to the axis. A port is provided to give access to each straight line path from at least one side of each flange. A housing portion is placed between each of the pair of flanges for housing the extruder barrel. The housing has a plurality of straight axial channels operably connecting the flanges to conduct fluid along the barrel from each of the straight line paths in one flange to a corresponding straight line path in the other flange. Finally, the device includes an inlet and an outlet for introducing fluid into and removing fluid from selective paths and channels.

5 Claims, 3 Drawing Sheets

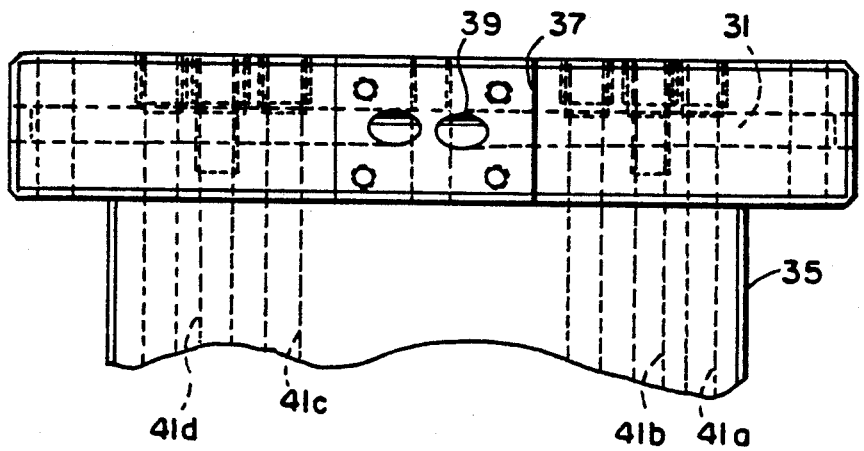
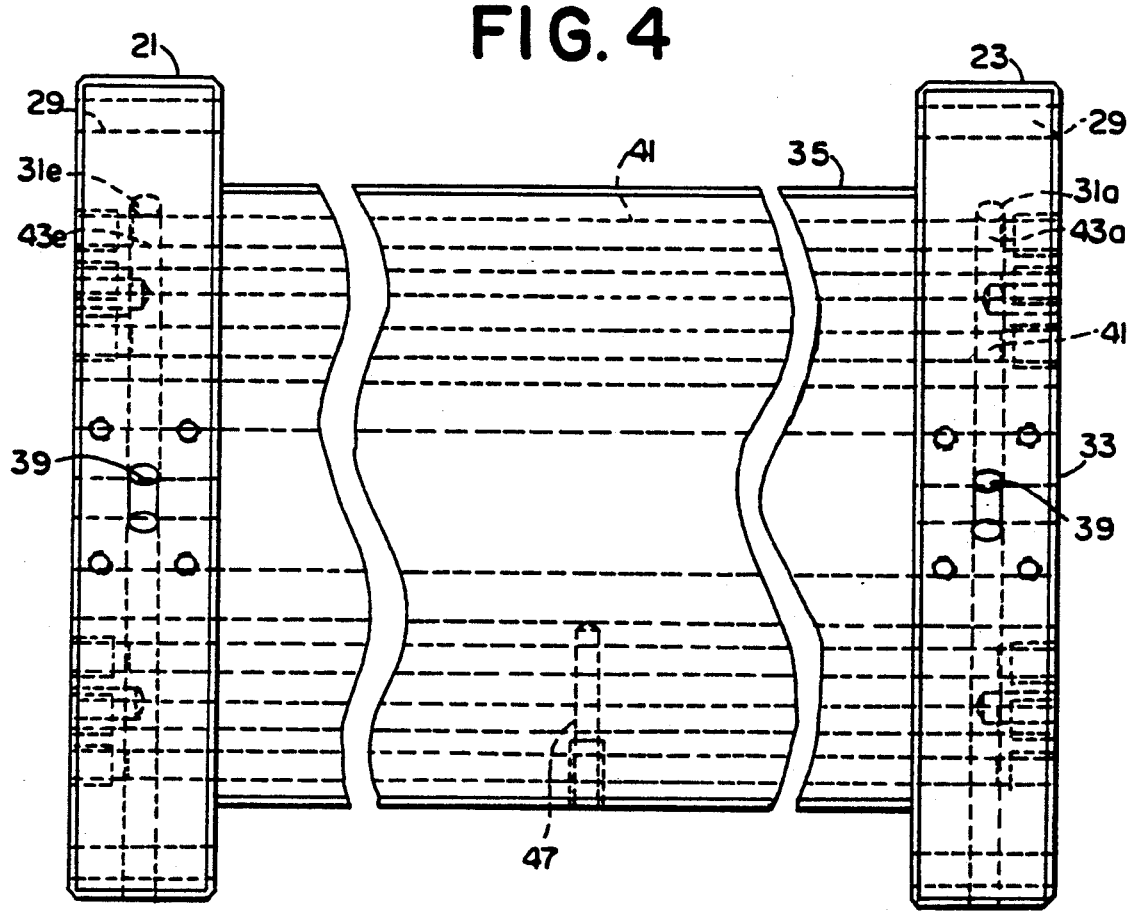

SEGMENTED BARREL EXTRUDER DEVICE

FIELD OF THE INVENTION

The present invention relates to an improved segmented barrel extruder device, and more particularly to a device for extruding along a longitudinal axis where improved heat exchange capabilities are provided in a new manner. More specifically, the invention relates to an improvement in the structure of end flanges and the housings between such flanges, where direct, line of sight paths for heating and cooling fluids are provided.

BACKGROUND OF THE INVENTION

Machines for plastic compounding have existed for many years now, and have progressed through many generations of development as technology improves and as plastic formulations change and place new demands on the compounding equipment. During this development, it has become technically and economically desirable to operate continuous processes.

For example, most production from linear low density polyethylene includes a continuous extruder machine. Polypropylene and EPDM, PVC (both rigid and flexible), thermoplastic rubbers, EVA, PE generally, and specialty formulations for video discs and records are other examples of compounding successes on continuous extruder machines.

The most effective continuous extruder designs are those which employ a twin screw extruder which is self cleaning and able to provide high capacity. The most efficient systems allow for multiple formulations to be processed on the same extruder, with the opportunity to customize the twin screw alignment for particular needs. Also used in some specific situations are single screw extruders, when the chemical and physical properties of the product require that treatment.

As is well known, chemical reactions in general and plastic production specifically needs to be controlled so that the reaction rate is maximized without adverse side effects. Thus heating and cooling functions are required, to maintain the plastics at a maximum efficiency. However, it is in this area that machines for continuous extrusion of plastics and the like have their most difficulties.

For example, polyethylene may be extruded at 200 to 250° F., while nylon is processed at about 650° F. In both cases, excessive heat will cause degradation of the expected properties, while low heat will lead to longer reaction times or incomplete reactions. Each chemical system has its own needs, as some are strongly exothermic while others need heat to be added to drive the reaction. Sometimes, the fillers, coloring agents, flame retardants and the like call for special temperature considerations. Thus the extruder must meet a wide range of operating conditions if it is to be useful over any reasonable range of products.

Heating can be accomplished with electric heaters, steam or hot oil, for example, while cooling is done with water or air. It is also possible to control temperature by controlling the rate of the extruder screws, so that faster or slower rates enhance or retard exothermic or endothermic conditions as needed. Nevertheless, there presently does not exist an extruder system which can accommodate any significant part of the total market, particularly where different temperature conditions must be met for each varied chemistry.

Conventional extruder technology is not capable of accommodating the wide range of temperature conditions in a single machine. Of course, the requirements of any particular chemistry can be designed into a machine system, but the likelihood of that machine being usable for other systems is small. Thus it would be a great advance in the art if an extruder system could be provided which would operate over a wide range of temperature ranges, both for heating and cooling.

Presently, heater bands are wrapped around the segments of an extruder system, so that heat can be applied electrically at desired locations. These heaters provide a heat for melting, mixing and driving the reaction. Electric heat is effective in most systems but is limited by the specific design which is installed on any given unit. By this is meant that electric heating might be installed for a particular temperature and heat exchange range of conditions, but that unit might not be usable for other conditions.

Under these circumstances, additional heating is provided, usually by steam or hot oil. This form of heat requires that there be access to the region near the extruder path in order to be effective. To date, no effective system has been provide to accommodate this need.

Cooling in the present generation of extruder machines is done by a number of somewhat effective but not perfect designs. Single screw extruders are actually thick walled piping, and cooling is applied by wrapping a spiral coil around the pipe. Heat transfer is effected in a spiral path, but this has been found to be generally acceptable for single screw units.

Double screw extruders are much more complicated, of course, and spiral wrapping of cooling coils has not been nearly as effective in providing fast, direct cooling to the product as it is carried, mixed, and reacted by the twin screw design. In addition, twin screw or double screw extruders achieve substantially greater mixing per unit of length, so that both cooling and heating control needs to be faster and more precise.

Still, the only method used by the prior art is to wrap the double screw segments with heater bands. Cooling as also achieved by direct contact with the outside of the barrel segment. This does not present an even temperature profile to the mixing and extrusion zones. Thus mixing rates, reaction conditions and overall process efficiencies are limited more by the temperature control than by the capabilities of the extruder itself.

Accordingly, it is a primary object of this invention to provide an efficient and effective heating and cooling system for extruder devices, in which heating and cooling can be accomplished over the widest range possible, to permit much greater use of the extruder on a wider variety of formulations.

Other objects will appear herein.

SUMMARY OF THE INVENTION

It has now been discovered that the above and other objects of the present invention may be accomplished in the following manner. Specifically, a new segmented barrel extruder device for extrusion along a longitudinal axis has been discovered. The device has a plurality of segments enclosing a barrel aligned on that axis.

The segments include a pair of axially perpendicular end flanges for each segment, each of said flanges having exposed sides and a central portion for housing an extruder barrel. The flanges have a plurality of straight line paths into and out of the flanges in a plane perpendicular to the axis. The flanges include port means for providing access to each straight line path from at least one side of said flange.

The device also includes a housing portion between each of said pair of flanges for housing the extruder barrel. The housing includes a plurality of straight axial channels operably connecting the flanges in order to conduct fluid along the barrel from each of the straight line paths in one flange to a corresponding straight line path in the other flange.

Finally, the device includes an inlet and an outlet for introducing fluid into and removing fluid from selective paths and channels.

The device may also include means for fastening segments together in alignment with said axis, as is customary. The flanges are preferably rectangular, and, in most cases, the paths in said flanges intersect at least three sides of said flanges.

In a preferred embodiment, each flange of said pair of flanges has correspondingly aligned paths in the other of said pair of flanges. The axial channels are operably connected to paths in said flanges to conduct fluid along said barrel from a plurality of points along one path in on flange of said pair of flanges to a corresponding plurality of points along a corresponding path the other of said pair of flanges.

BRIEF DESCRIPTION OF THE DRAWINGS

For a more complete understanding of the invention, reference is hereby made to the drawings, where like numbers refer to like elements, in which:

FIG. 3 is a plan view and FIG. 4 is a side elevational view of the device shown in FIG. 2.

DETAILED DESCRIPTION OF THE INVENTION

Figure 1:
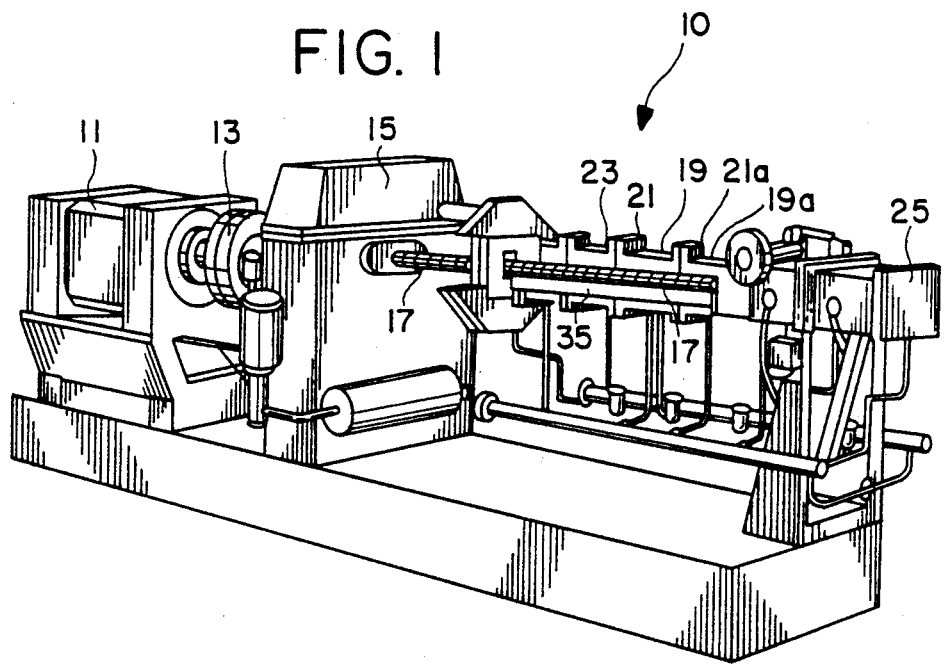
FIG. 1 is a schematic, perspective view showing the overall location of the device of the present invention in its intended place of operation.

As shown in FIG. 1, an extruder device generally identified as 10 has a drive motor 11, a clutch 13 and a gear system 15 which powers and drives the extruder. The particular formulation is fed into the extruder and is mixed, reacted and extruded by a pair of extruder screws 17. The extruder screws 17 move the formulation through a series of segments 19.

Segments 19 include a pair of flanges 21 and 23, each being located on one end of segment 19. Flange 23, shown in FIG. 2, has a central portion 27 which is sized to accommodate a double screw self-wiping extruder, shown generally as 17 but not shown in detail. Bolt holes 29 are provided so that the flange 23 can be fastened to the adjacent flange 21a, such as shown in FIG. 1. The number of segments 19 will depend on the particular machine design. In some designs, the number can be varied, as conditions vary.

Figure 2:
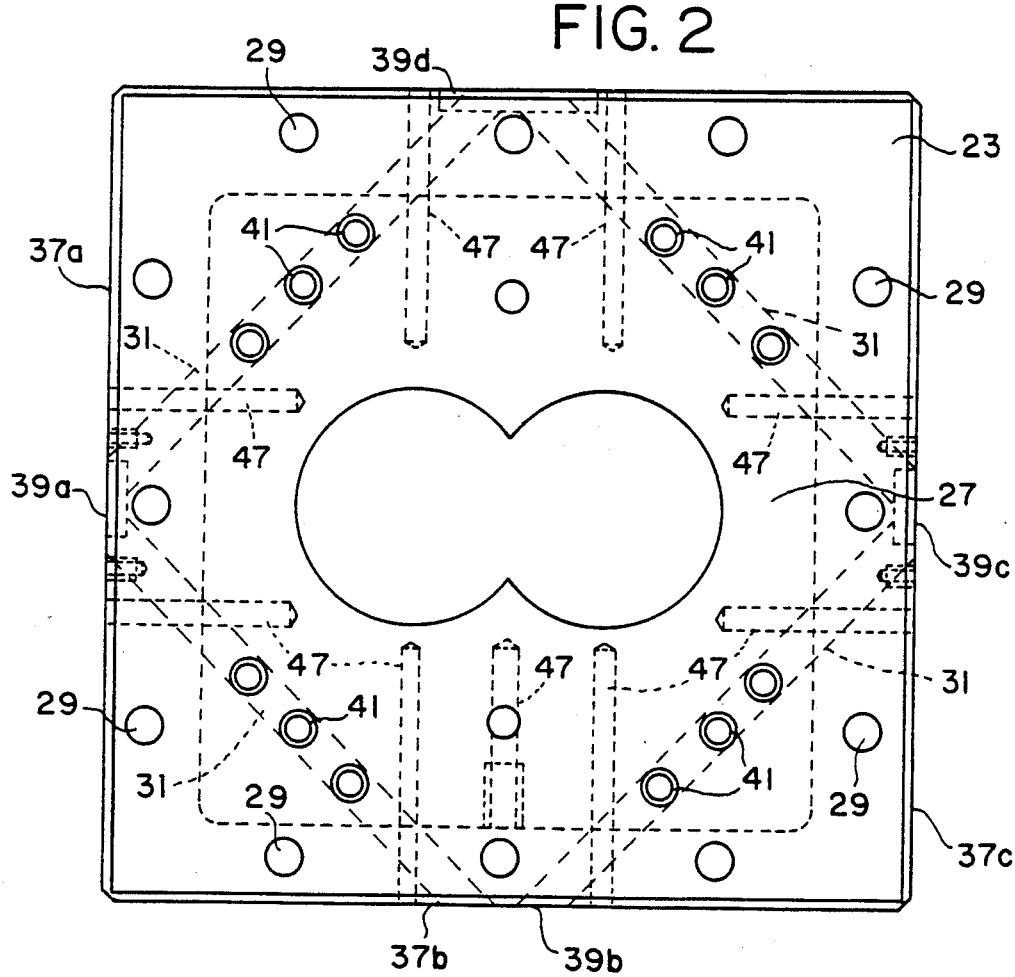
FIG. 2 is an end elevational, sectional view of one embodiment of the present invention.

The flanges 21 and 23 have a plurality of straight line paths 31, preferably four in number as shown in FIG. 2. These paths 31 extend into and out of the flange 23 in a plane which is perpendicular to the axis 33, in FIG. 4. Axis 33 is the longitudinal axis of extrusion, and barrel 27 is parallel to axis 33, for example, as is the housing portion 35 of segment 19.

Paths 31 intersect at least three sides 37a, 37b and 37c of flange 23 and include ports 39a, 39b, and 39c respectively. Each port 39 provides access to each straight line path 31 with the corresponding side 37 of flange 23. Having a straight line path 31 and having access to the path 31 with a port 39 provides an important advantage, whereby cleaning, de-scaling, unplugging and other maintenance functions can be performed. This feature provides for a segment useful life which is several times greater than other designs. The economies are substantial.

It is possible to provide a fourth side with a port 39d, similar to the other ports such as port 39a. This fourth port 39d provides a design in which there are four quadrants, so that fluid can flow for heating or cooling through all four or through each quadrant separately.

Also, temperature probes 47 are positioned close to the barrel 27, to sense temperature at all points along the reaction segments. These probes 47 can be connected to a computer for specific process control.

Channels 41 are positioned adjacent to all sides of barrel 27 and are aligned radially outward from axis 33. Channels 41 are operably connected to flanges 21 and 23 so that they intersect and communicate with paths 31. Channels 41 are preferably aligned from a plurality of points 43a on path 31a of flange 23 to a corresponding plurality of points 43e on path 31e on flange 21.

Channels 41 not only communicate with paths 31 in each flange 21 and 23 of each segment 19, channels 41 can also communicate with channels in adjacent segments, so that a wide variety of flow paths are possible. In this embodiment, cleaning of the axial channels is also easy, and scale, corrosion or sediment can be frequently removed, keeping the heat transfer coefficient relatively constant. This, of course, permits more uniform production conditions.

Fluid can be introduced at either the upstream end and flow downstream, or the reverse is equally possible. In addition, fluid can be introduced in each downstream flange 23 and removed from the corresponding upstream flange 21, for example, to permit greater temperature differential between the channels 41 and the extruder barrel 27. Flow in the various quadrants can be simultaneously counterflowing, or they can all flow in the same direction. The flexibility of the present invention is remarkably broad.

As the fluid travels from flange 23 to flange 21, heat transfer takes place with that portion of barrel 27 which is adjacent to that segment 19. Replacement of the fluid in the next segment 19a will keep the temperature differential at a maximum.

Figure 5:
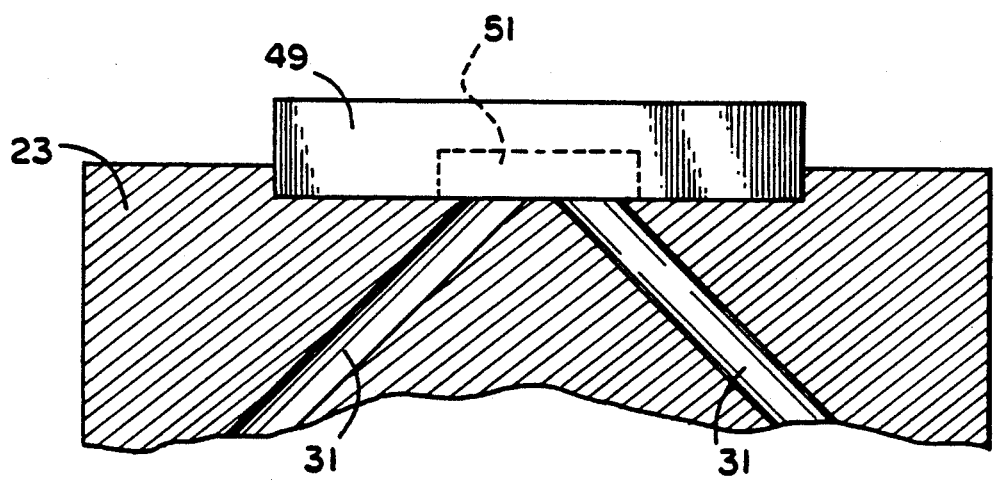
FIGS. 5 and 6 show alternate path ends.
Figure 6:
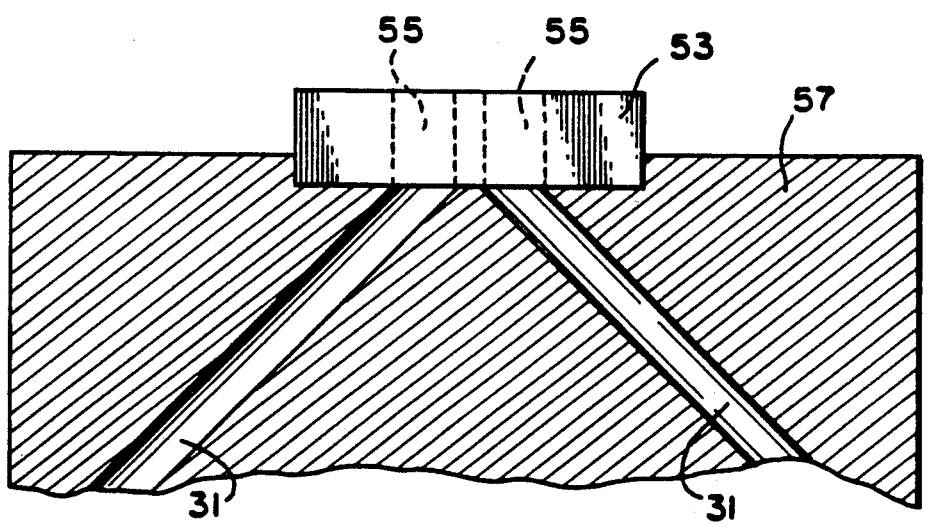

Shown in FIG. 5 and FIG. 6 are two alternative end units for the paths 31 to intersect the side walls 37 of the present invention. In FIG. 5, the fluid travels out from one path 31 into end cap 49 via path 51 and then into the next path 31, so that one source of fluid can be used. In FIG. 6, an end cap 53 has two fittings 55 for inlet and outlet separately for each path 31. Fluid might come out one fitting 55, and be re-heated or re-cooled, and then reintroduced into the other fitting 55. It will be appreciated that many options are available with the present invention. Valves and computer control can be tailored for each specific process.

The present invention is also capable of providing heating in one segment 19 and cooling in another segment 19a, so that, for example, the mixing stage can have heat to promote melting, while the reaction stage can have cooling to control an exotherm (or heat to control an endothermic reaction) and the final extrusion can be carried out at the particular temperature which is ideal for that stage.

One particular advantage of the present invention is derived from the fact that the paths 31 are at a right angle to the channels. Not only is it easier to clean the paths and channels, fluid flow is markedly improved.

In order to achieve maximum heat transfer, it is sometimes desirable that fluid flow be turbulent, rather than laminar. In straight line or gentle flow patterns, flow rates must be excessive in order to achieve turbulence and maximum heat transfer. These flow rates can often be so rapid that heat transfer efficiencies are lost.

In the present invention, fluid is caused to turn at right angles as it is introduced in channel 41 from path 31, so that turbulence is introduced. Much greater heat transfer efficiencies are possible with the device of the present invention than has been possible in the prior art. It is also possible to introduce removable turbulence causing elements because of the straight line access to the channels and paths.

Various embodiments and features of the present invention have been shown in the foregoing. Other embodiments will also be seen without departing from the scope and spirit of the invention.

Having thus described the invention, what is claimed is:

1. A segmented barrel extrude device for extrusion along a longitudinal axis, said device having a plurality of segments enclosing an extrude barrel aligned on said longitudinal axis, said segments comprising:

a pair of axially perpendicular rectangular end flanges for each segment, each said pair of end flanges having exposed sides and a central portion for housing said extrude barrel, each said pair of end flanges having a plurality of aligned straight line paths for fluid flow into and out of said flanges in a plane perpendicular to said longitudinal axis, wherein said straight line paths each intersect two of said exposed sides without intersecting said central portion, and port means for providing access for fluid flow to each straight line path from at least one of said sides of said flange;

a housing portion between each of said pair of flanges for housing said extrude barrel, said housing having a plurality of straight axial channels radially outside said extrude barrel and is connected perpendicular to said straight line paths in said end flanges to conduct fluid along the outside of said barrel from a plurality of points along one path in each of said straight line paths in one of said pair of end flanges to a plurality of points along a corresponding straight line path in the other of said pair of end flanges; and an inlet means and an outlet means for introducing fluid into and removing fluid from selective straight line paths and straight axial channels though said port means.

2. The device of claim 1 wherein said pair of end flanges are square.

3. The device of claim 1, wherein said extrude barrel includes at least two extrude paths along said longitudinal axis, said extruder paths being formed by a double screw extruder.

4. The device of claim 1, wherein said port means includes means for providing access to each of said straight line paths independently.

5. The device of claim 1, wherein said port means includes means for providing access to adjacent straight line paths simultaneously.

* * * * *